United States Patent [19]

Shorey

[11] 4,077,590
[45] Mar. 7, 1978

[54] INTEGRATED TREADWAY CARGO HANDLING SYSTEM

[75] Inventor: Thomas H. Shorey, Freeland, Wash.

[73] Assignee: The Boeing Company, Seattle, Wash.

[21] Appl. No.: 665,765

[22] Filed: Mar. 11, 1976

[51] Int. Cl.² ............................................. B60P 1/00
[52] U.S. Cl. .................................. 244/118 R; 214/84
[58] Field of Search ...................... 244/118 R, 137 R; 214/84; 105/375, 463, 464

[56] References Cited

U.S. PATENT DOCUMENTS

| 2,786,428 | 3/1957 | Arnold | 244/118 R |
|---|---|---|---|
| 3,203,527 | 8/1965 | Daetwyler | 214/84 |
| 3,262,588 | 7/1966 | Davidson | 244/137 R |
| 3,294,263 | 12/1966 | Naden et al. | 214/84 |
| 3,899,092 | 8/1975 | Nordstrom | 244/118 R |
| 3,906,870 | 9/1975 | Alberti | 244/137 R |

FOREIGN PATENT DOCUMENTS

| 858,596 | 1/1961 | United Kingdom | 244/118 R |

*Primary Examiner*—Trygve M. Blix
*Assistant Examiner*—Charles E. Frankfort
*Attorney, Agent, or Firm*—Christensen, O'Connor, Johnson & Kindness

[57] ABSTRACT

An integrated treadway cargo handling system comprising a plurality of treadway panels suitable for converting an aircraft from passenger use to cargo use is disclosed. The treadway panels include inboard and outboard panels arrayed in spaced rows and columns on the deck of the aircraft. The rows are spaced from, and attached to, one another by panel restraint bars that are affixed to seat tracks located in the deck of the aircraft. The inboard treadway panels support retractable inboard guide rail, vertical restraint and roller assemblies, and the outboard treadway panels support outboard guide rail, longitudinal-vertical restraint and roller assemblies. In addition, adjacent edges of the inboard and outboard treadway panels support flip-up rollers. Further, tie down rings, also affixed to the seat tracks, are located in apertures in the treadway panels. Also, side load tie down brackets form part of the panel restraint bars. Finally, invertible casters and rollers are housed in the panels located at the forward end of the aircraft. The retractable nature of the guide rail and roller assemblies, the flip-up rollers and the invertible casters and rollers allow the aircraft to transport either rolling stock entirely, cargo pallets entirely, or a mixture of rolling stock and cargo pallets.

29 Claims, 23 Drawing Figures

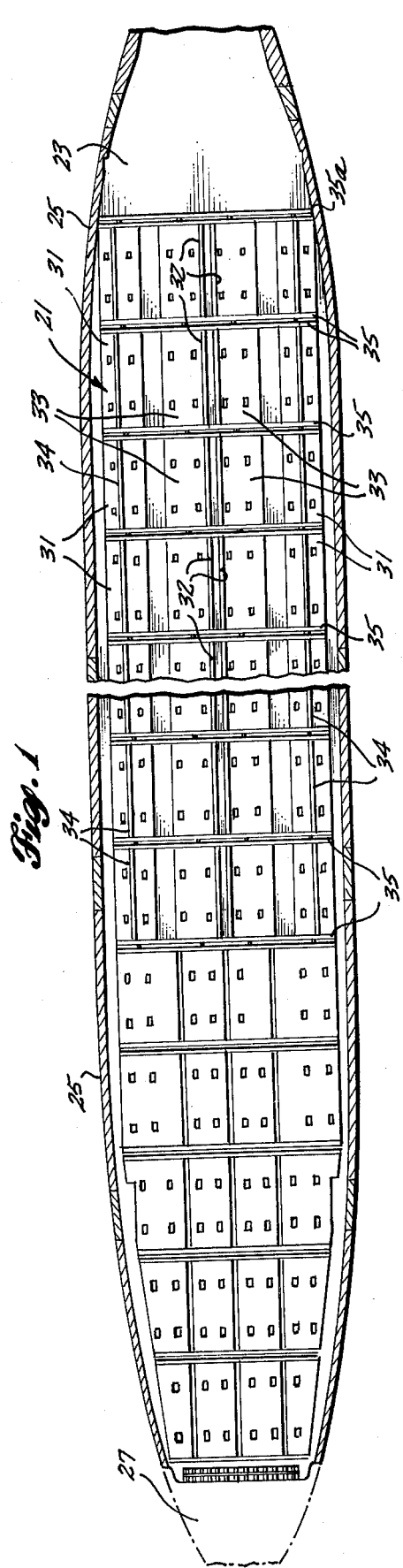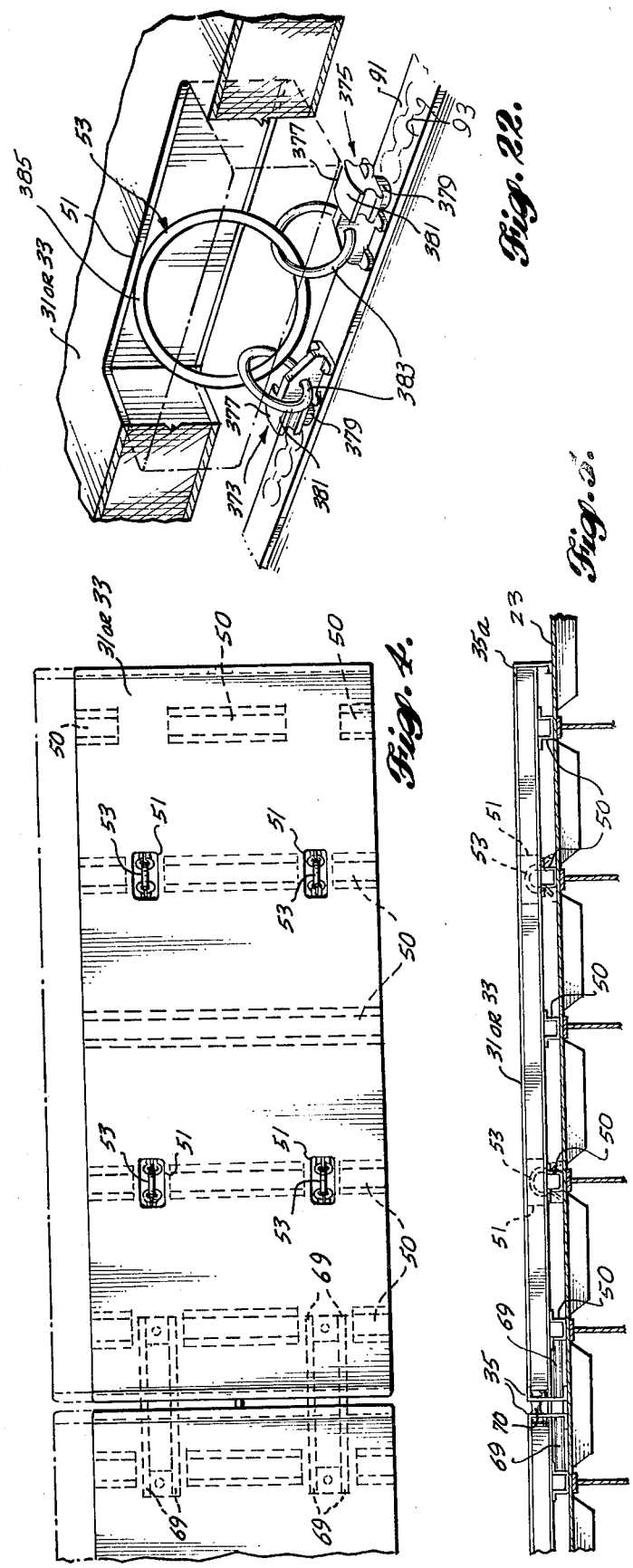

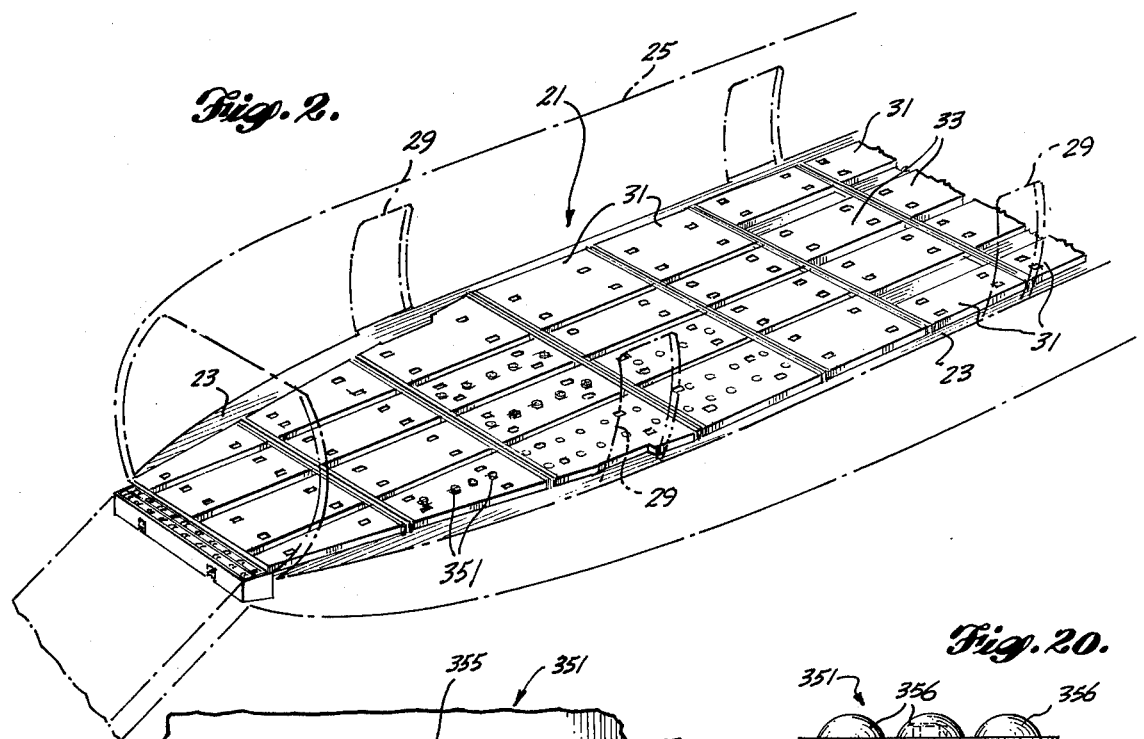
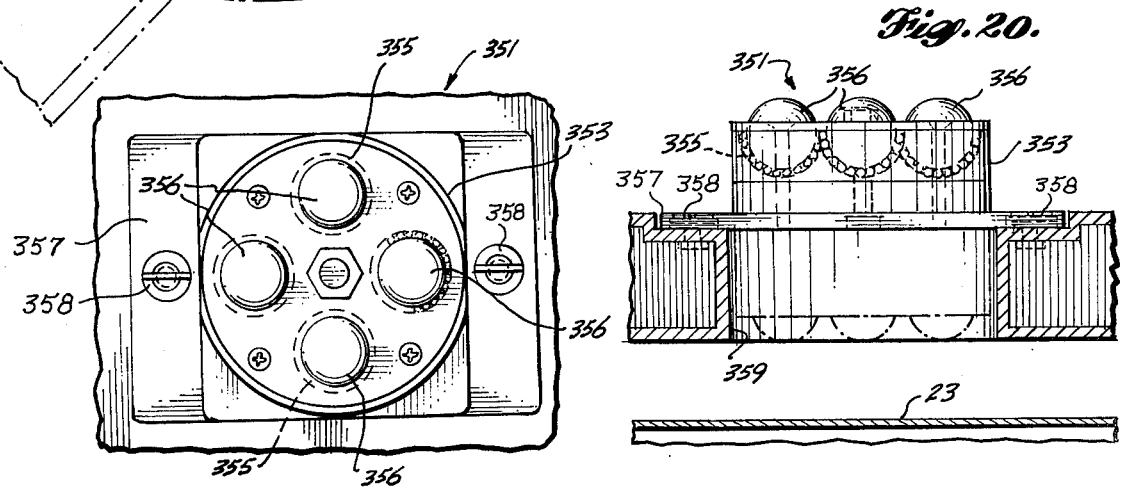
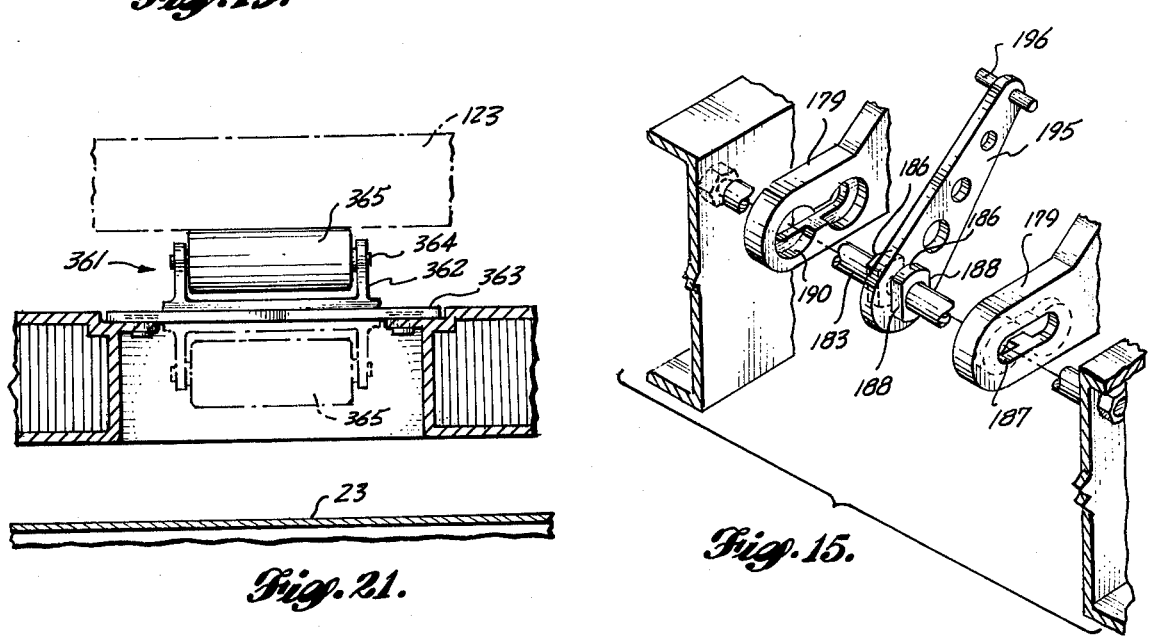

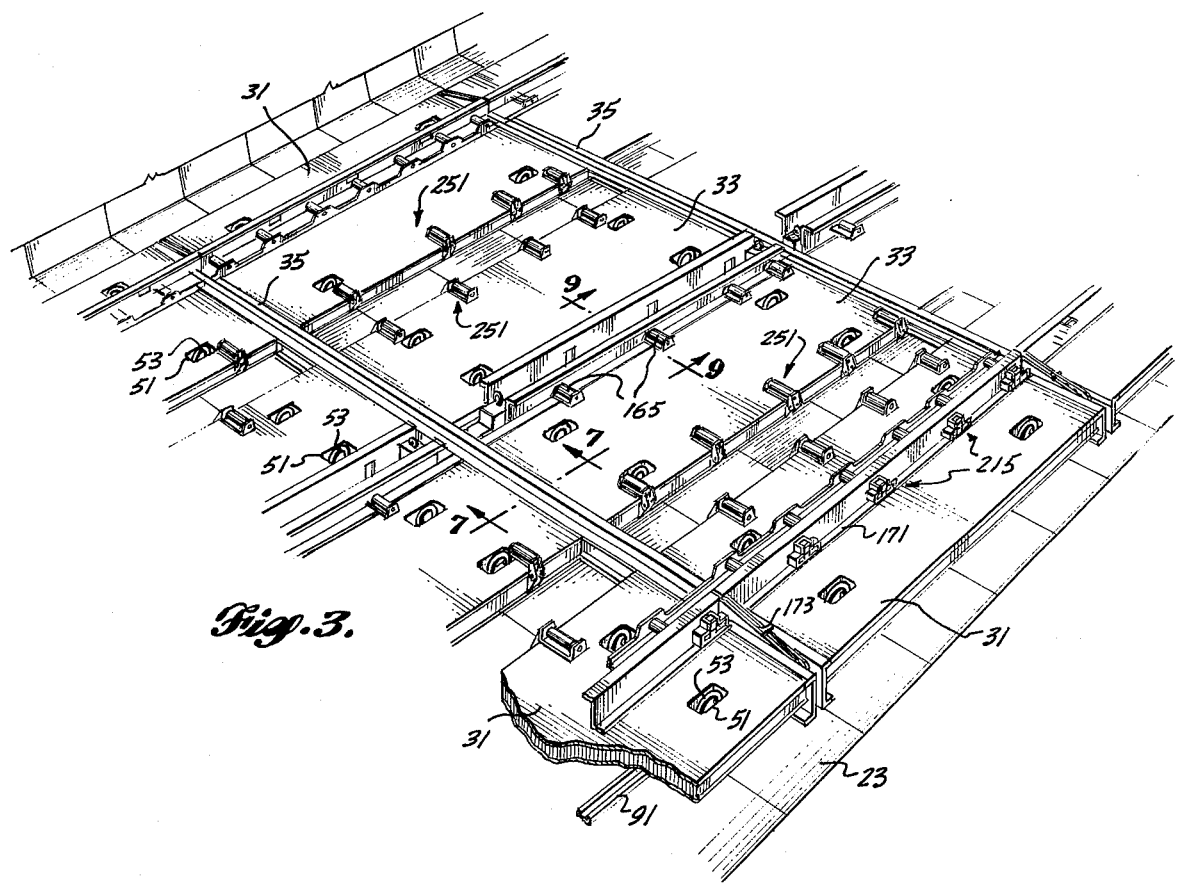
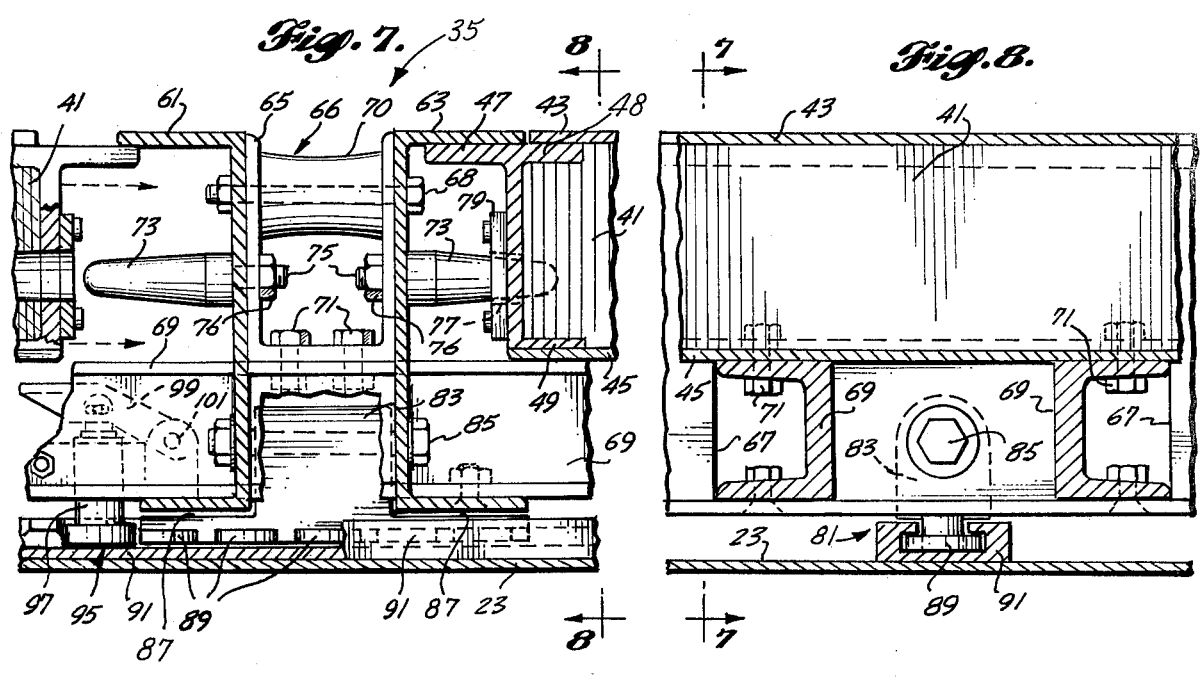

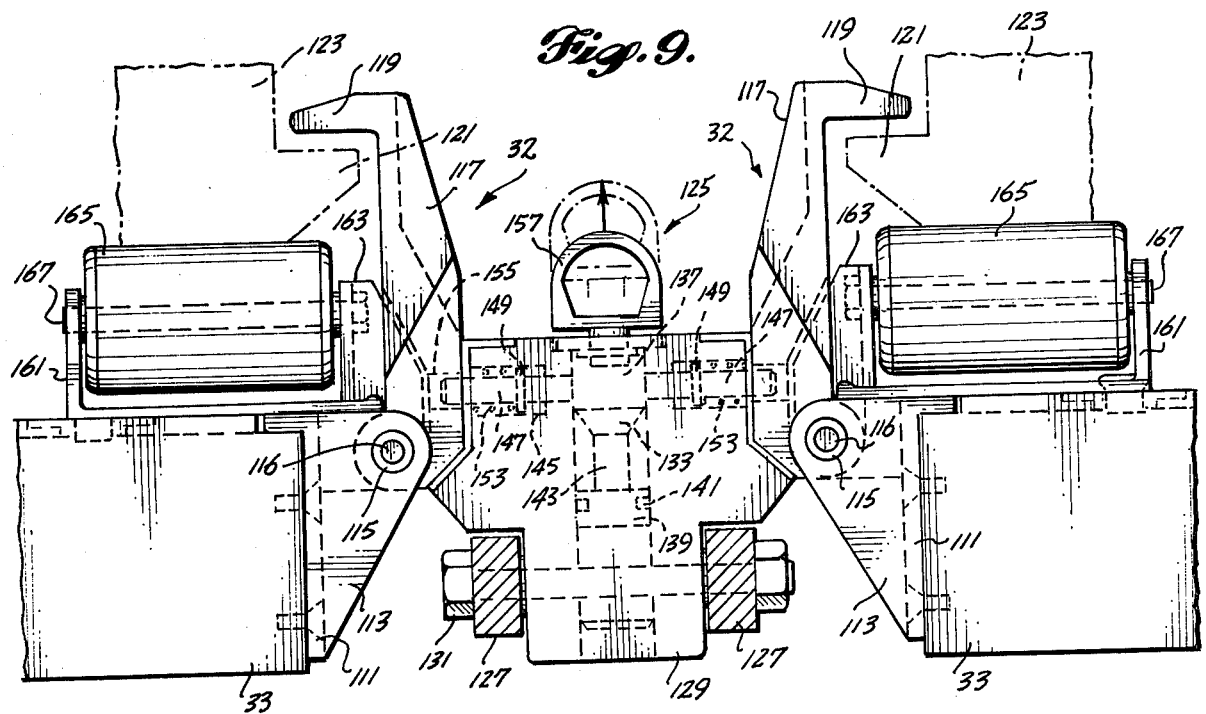

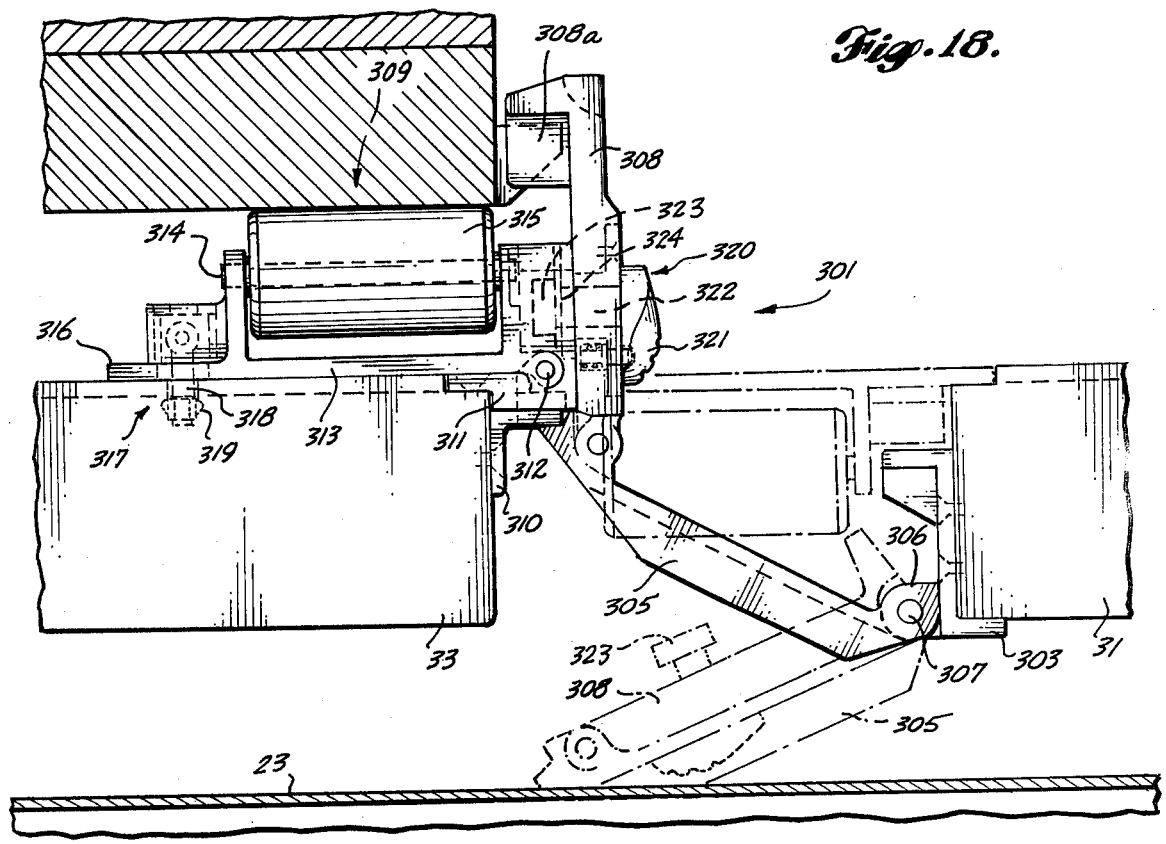
Fig. 18.
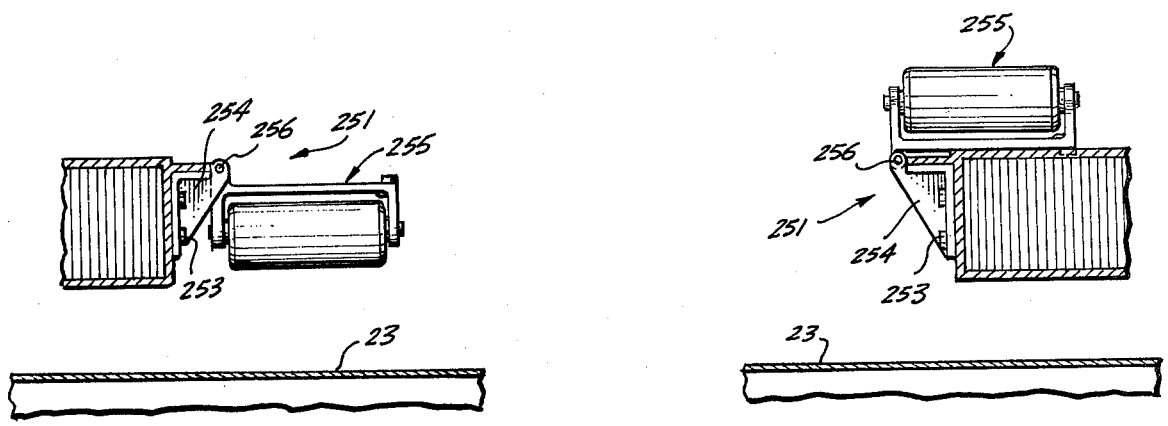
Fig. 17a.
Fig. 17b.

INTEGRATED TREADWAY CARGO HANDLING SYSTEM

BACKGROUND OF THE INVENTION

This invention is directed to cargo handling systems and, more particularly, to cargo handling conversion systems for converting an aircraft from passenger use to cargo use.

In the past, the interiors of aircraft have been structured in accordance with the intended use of the aircraft. In the case of passenger aircraft, the interior walls and deck of the aircraft have been structured to support seats and other passenger convenience items, such as restrooms, stewardess stations, etc. The walls and deck are structured so that such items are readily installable without undue difficulty. In many aircraft some of these items can be readily repositioned. For example, seat tracks located in the deck of an aircraft allow seat positions to be readily and rapidly changed. Similarly, the interiors of cargo aircraft previously have been configured such that various cargo related mechanisms, such as tie down rings and restraint mechanisms for cargo pallets are installed in desired positions so that cargo can be readily loaded and lashed down. In the past, in order to convert an aircraft configured for one type of use to another type of use, the interior of the aircraft first has been substantially gutted of elements related to the previous use. Not only have easily installable structures been removed, more difficult to remove structures, such as wall panels, deck flooring, etc., have also been removed. Thereafter, structures related to the desired use have been installed. Obviously, such conversion is time consuming and, therefore, expensive. Thus, in order to reduce the time and, thus, the cost, it is desirable to provide a system providing for the removal of a minimal number of elements and the rapid conversion of an aircraft from one type of use to another type of use and vice versa.

Therefore, it is an object of this invention to provide a new and improved system for rapidly converting an aircraft from one type of use, e.g., passenger use, to another type of use, e.g., cargo use.

It is another object of this invention to provide a system for converting an aircraft from one type of use to another type of use that requires the removal of a minimal number of components directed to one or the other uses.

It is a still further object of this invention to provide a system for rapidly and quickly converting an aircraft from passenger use to cargo use and vice versa.

While the prior art has proposed some systems for converting an aircraft having an interior designed for a particular use to another use, these systems have not been as functional as desirable. For example, such systems have been poorly suited for use with relatively large cargo pallets designed to be held in place by specific mechanisms, such as parallel guide rails. Moreover, such systems have been designed such that they are suitable for transporting either cargo on pallets, or rolling cargo; but not a mixture of both types of cargo.

Therefore, it is a further object of this invention to provide a new and improved cargo handling system suitable for converting an aircraft from passenger use to cargo use and suitable for transporting both rolling and nonrolling cargo, or a mixture of both of these types of cargo.

It is yet another object of this invention to provide a new and improved cargo handling system including mechanisms suitable for holding cargo pallets in place on the deck of an aircraft.

It is a more specific object of this invention to provide a new and improved cargo handling system suitable for converting an aircraft from passenger use to cargo use including subsystems that allow the converted aircraft to readily transport cargo pallets, rolling stock, or a combination of cargo pallets and rolling stock.

SUMMARY OF THE INVENTION

In accordance with principles of this invention, an integrated treadway cargo handling system is provided. The integrated treadway cargo handling system comprises a plurality of treadway panels arrayed in rows and columns on the deck of an aircraft. The rows of the treadway panel are spaced from, and attached to, one another by panel restraint bars that are also affixed to the seat tracks of the aircraft.

In accordance with other principles of this invention, the plurality of treadway panels include inboard treadway panels and outboard treadway panels. The inboard treadway panels support retractable inboard guide rail, vertical restraint and roller assemblies. The outboard treadway panels support outboard guide rail, longitudinal-vertical restraint and roller assemblies. When the guide rail and roller assemblies are extended, lips formed in the top of inboard guide rails face lips formed in the top of outboard guide rails. The lips are adapted to lie above longitudinal flanges located along the lower lateral edges of standard cargo pallets and form vertical pallet restraints. The pallets are, in turn, supported by rollers located beneath the lips.

In accordance with further principles of this invention, adjacent edges of the inboard and outboard treadway panels support flip-up rollers adapted to further support the cargo containers located between the extended inboard and outboard guide rail, restraint and roller assemblies.

In accordance with yet further principles of this invention, tie down rings are located in apertures formed in the treadway panels. The tie down rings are also affixed to the seat tracks of the aircraft. Further, side load tie down brackets form part of the panel restraint bars. Also, cargo pallet latch hooks are located in some of the guide rails to provide longitudinal restraints against pallet movement. Finally, invertible casters and rollers are housed in panels located in one end of the aircraft. The invertible casters and rollers allow cargo pallets to be aligned with the extended inboard and outboard guide rails, restraint and roller assemblies, prior to their being moved longitudinally between such assemblies to a final transportation position.

It will be appreciated from the foregoing summary that the invention provides a new and improved cargo handling system adapted to rapidly convert an aircraft from passenger use to cargo use. Conversion is accomplished by merely removing passenger amenities, such as seats, restrooms and service stations and, thereafter, inserting an array of treadway panels. The treadway panels allow the deck of the aircraft to readily be converted in a manner such that cargo pallets and/or rolling stock can be readily transported. The treadway panels and associated positioning and restraining mechanisms provide a system wherein cargo pallets can be rapidly and quickly positioned, and either lashed to the treadway panels or locked in place. Alternatively, the positioning mechanisms can be rapidly withdrawn to allow rolling stock to be loaded on board the aircraft and lashed in place.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a plan view of an integrated treadway cargo handling system formed in accordance with the invention affixed to the deck of an aircraft;

FIG. 2 is a perspective view of the forward end of an aircraft fuselage (in phantom) illustrating a portion of an integrated treadway cargo handling system, formed in accordance with the invention, mounted in place;

FIG. 3 is a partial perspective view of an array of treadway panels, panel restraint bars, inboard and outboard guide rail, restraint and roller assemblies, and flip-up roller assemblies all formed in accordance with the invention;

FIG. 4 is a plan view illustrating the location of tie down ring apertures formed in the treadway panels;

FIG. 5 is a partial, longitudinal, cross-sectional view illustrating a treadway panel mounted on the deck of an aircraft;

FIG. 7 is a partial cross-sectional view along line 7—7 of FIG. 3 (or 7—7 of FIG. 8) illustrating a panel restraint bar affixed to the deck of an aircraft, and the attachment of treadway panels to the panel restraint bar;

FIG. 8 is a cross-sectional view along line 8—8 of FIG. 7;

FIG. 9 is a cross-sectional view along line 9—9 of FIG. 3 illustrating an inboard guide rail, vertical restraint and roller assembly in an extended position;

FIG. 10 is a cross-sectional view along line 9—9 of FIG. 3 illustrating an inboard guide rail, vertical restraint and roller assembly in a retracted position;

FIG. 15 is an exploded, perspective view of a locking arm assembly forming part of the outboard guide rail, longitudinal-vertical restraint and roller assemblies;

FIGS. 17a and b are a cross-sectional view of a flip-up roller assembly in retracted and extended positions, respectively;

FIG. 18 is a cross-sectional view of a forward guide rail, restraint and roller assembly;

FIG. 19 is a plan view of an invertible caster assembly;

FIG. 20 is a cross-sectional view of an invertible caster assembly;

FIG. 21 is a cross-sectional view of an invertible roller; and

FIG. 22 is a perspective view of a hold down ring assembly.

DESCRIPTION OF THE PREFERRED EMBODIMENT

Figure 6:
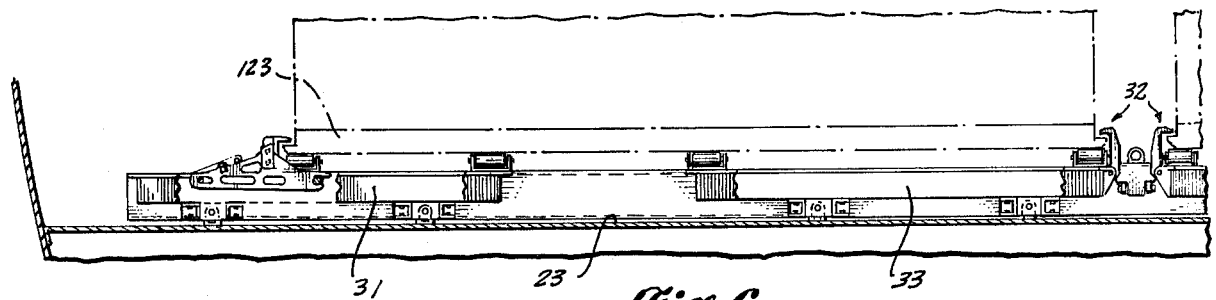
FIG. 6 is a partial, transverse, cross-sectional view illustrating inboard and outboard treadway panels mounted on the deck of an aircraft.

FIG. 1 is a plan view illustrating an integrated treadway cargo handling system 21 formed in accordance with the invention. The integrated treadway cargo handling system 21 is illustrated as affixed to the deck 23 of the fuselage 25 of an aircraft. As viewed in FIG. 1, the nose of the aircraft is on the left side and the tail is on the right side. While the aircraft may take on a variety of forms, the invention was developed for use in combination with a 747 aircraft, produced by the Boeing Company of Seattle, Washington. In one configuration of the 747 aircraft, access to the interior of the fuselage 25 is via the nose 27 of the aircraft. In such aircraft, the nose 27 is electrically raisable and lowerable. When raised, a ramp (illustrated in phantom in FIG. 2), or lift mechanism, provides for the raising and lowering of cargo between the deck 23 of the aircraft and the ground. In alternate configurations, entry into the fuselage of a 747 aircraft is through a door or doors 29 located in the side of the fuselage, at least one of which is located forward of the wings of the aircraft.

As will be better understood from the following description of a preferred embodiment, the present invention was designed for use with aircraft providing for cargo loading in the forward part of the fuselage, i.e., via the nose 27 or via side doors 29 located in front of the wings. However, the invention is equally suited for use with aircraft that provide for cargo loading in other regions, such as through the tail of the aircraft or side doors located aft of the wings, if suitable changes in the positions of various subsystems are made. Moreover, while the invention was developed for use in combination with a 747 aircraft, and is described in such an environment, it will be appreciated that the invention is also suitable for use with other types of aircraft.

As best seen in FIGS. 1 and 2, the integrated treadway cargo handling system 21 of the invention comprises a plurality of treadway panels mounted in spaced rows and columns. Four columns are illustrated, two outer columns and two inner columns. A plurality of outboard treadway panels 31 form the outer columns and a plurality of inboard treadway panels 33 form the inner columns. Thus, each row of panels includes two outboard treadway panels 31 and two inboard treadway panels 33. Each of the rows of treadway panels are separated from adjacent rows by a panel restraint bar 35. While all of the rows include outboard and inboard treadway panels, the outboard treadway panels vary in size and shape toward the front or nose end of the aircraft, so as to conform to the wall configuration of the fuselage 25 in that region. In addition, certain guide rail, restraint and roller assemblies associated with the forward treadway panels differ from those associated with the main body treadway panels, as more fully described hereinafter.

TREADWAY PANELS

The basic structure of the outboard and inboard treadway panels 31 and 33 is generally the same; however, certain of the assemblies affixed thereto differ in nature and position, as hereinafter described. FIGS. 2–8 best illustrate the size, shape and structure of the treadway panels. In general, except for the outer edge of the forward, outboard treadway panels, the treadway panels are rectangular. Preferably, the treadway panels comprise an inner honeycomb core 41 (FIG. 8) enclosed by top and bottom panels 43 and 45, formed of sheets of aluminum or some other metal.

The edges of the panels are enclosed by suitable structural elements, such as channels, I beams, etc. or combinations thereof, most of which are hereinafter described with respect to the mounting of particular guide rail, restraint and roller assemblies. In this regard, the edges of the panels, lying transverse to the longitudinal axis of the aircraft and affixed to the panel restraint bars 35, are, as best illustrated in FIG. 7, enclosed by T-beams 47. The T-beams include lower orthogonal flanges 49 lying parallel to one of the arms 48 of the T-beams. The T-beams are positioned such that the top panels 43 of the treadway panels are attached to the arm of the T-beam 47 lying above the flanges 49, and the bottom panels 45 are attached to the flanges.

In addition, as best illustrated in FIG. 5, spaced along the bottom of the panels are inverted return flange hat elements 50 The return flange hat elements lie orthogonal to the longitudinal axis of the aircraft fuselage and their lower surfaces rest on the deck 23. Five return flange hat elements 50 are illustrated, even though a greater or lesser number can be used, as desired. Located intermediate the ends of each "second" and "fourth" return flange hat elements 50 are two spaced apertures 51. The apertures 51 pass through the panels as well as the return flange hats so as to allow down ring assemblies 53 to be attached to seat tracks located in the deck 23 of the aircraft, as hereinafter described, and provide access to such assemblies.

PANEL RESTRAINT BARS

As best seen in FIGS. 3 and 7, the panel restraint bars 35 are elongated assemblies, each including a pair of C-channels 61 and 63 that are substantially equal in length to the width of the deck of the aircraft at the particular point where they are mounted. The C-channels 61 and 63 are mounted in back-to-back, spaced relationship with respect to one another by a U-channel 65, equal in length to the length of the C-channels. The legs of the U-channel are generally equal in width to the thickness of the treadway panels. Thus, when the U-channel 65 is mounted between the C-channels 61 and 63 such that the top of the legs of the U-channel 65 are generally co-planar with the upper legs of the C-channels 61 and 63, the base of the U-channel 65 is generally co-planar with the bottom of adjacent treadway panels mounted such that their tops are co-planar with the upper legs of the C-channels.

Mounted between the legs of the U-channel 65, at spaced locations, are side load tie down brackets 66. The side load tie down brackets 66 comprise bolts 68 passing through the legs of the U-channel and the webs of the C-channels, plus metal spools 70 mounted on the bolts 68. The metal spools 70 lie between the legs of the U-channel 65.

Mounted beneath the U-channel 65 so as to pass orthogonally through spaced apertures 67 formed in the webs of the C-channels 61 and 63 are spaced back-to-back support C-channels 69. The support C-channels 69 are affixed to the web of the U-channel 65 by any suitable means such as bolts 71.

Projecting outwardly from the C-channels 61 and 63, at spaced locations along the lengths of the C-channels are a plurality of pins 73. The pins 73 may include undercut threaded studs 75, which pass through aligned apertures formed in the webs of the C-channels and in the legs of the U-channel. Nuts 76 screwed onto the studs 75 clamp the pins 73 in place. The pins 73 are positioned such that they are adapted to enter apertures 77 formed at aligned positions in the transverse edge T-beams 47 of adjacent treadway panels. Preferably, the edge apertures 77 are reinforced by apertured flanges 79 aligned with, and surrounding, the edge apertures 77.

Located beneath the lower legs of the C-channels 61 and 63 are a plurality of spaced seat track fittings 81. Each seat track fitting 81 includes an upwardly projecting hub 83 lying between the support C-channels 69, and between the webs of the C-channels 61 and 63. The hubs include longitudinal apertures through which attachment bolts 85 pass. The attachment bolts also pass through apertures formed in adjacent regions of the web of the C-channels 61 and 63. Forming part of each seat track fitting and located beneath the hub 83 are arms 87 that extend orthogonally outwardly. Projecting downwardly from the arms 87 are a plurality of steel studs 89. The steel studs are adapted to pass through apertures formed in seat tracks 91.

More specifically, as illustrated in FIGS. 3, 7, 8 and 22, elongated seat tracks 91 are located in the deck 23 of the fuselage 25 of the aircraft. The seat tracks lie along axes that lie parallel to the longitudinal axis of the fuselage. Each seat track is generally U-shaped in cross-sectional configuration and includes inwardly projecting flanges. Spaced along the flanges are a plurality of circular apertures 93. (FIGS. 22) The spacing between the steel studs 89 equals the spacing between the circular apertures 93. Further, the steel studs include heads slightly smaller in diameter than the diameter of the circular apertures, and smaller diameter shanks. The shanks have a diameter slightly smaller than the spacing between the inwardly projecting flanges lying outside of the circular aperture regions. Thus, when the heads of the studs 89 of the seat track fitting 81 are appropriately aligned with the cylindrical apertures 93 in the seat track 91, the studs 89 will drop through the apertures into the interior of the track 91 to a point where they lie beneath the inwardly projecting flanges. After installation in this manner, the studs, and the remainder of the panel restraint bars affixed thereto via the hub 83, can be moved longitudinally along the track.

Affixed to one of the lower arms of a C-channel, illustrated as the C-channel 61 located on the left in FIG. 7, is a panel restraint bar lock 95. The panel restraint bar lock 95 is similar to a standard seat track index lock and generally comprises a downwardly projecting pressure plunger 97 having a head adapted to interact with one of the circular apertures in the seat track 91. The pressure plunger 97 is affixed via a lever arm 99 to a bracket 101 extending upwardly from the arm of the associated C-channel 61. When the plunger is aligned with a circular aperture, a coil spring (not shown), mounted in a housing surrounding the plunger, presses the plunger head into the aperture and locks the related panel restraint bar in place against longitudinal movement. The plunger is positioned such that the steel studs must be located intermediate the circular regions when the plunger is aligned with an aperture. Release is accomplished by merely raising the lever arm 99.

INSTALLATION OF TREADWAY PANELS AND PANEL RESTRAINT BARS

Preferably, the treadway panels and the panel retraint bars are installed by starting at one end (e.g., tail) of the aircraft 25 and proceeding toward the other end (e.g., nose). Initially, an end panel restraint bar 35a is installed. The end panel restraint bar 35a may comprise essentially one-half of a panel restraint bar 35, split down its longitudinal axis. The end panel restraint bar 35a is installed by aligning the bar's steel studs 89 with, and allowing them to drop into, adjacent apertures in the seat tracks 91 spaced across the deck of the aircraft. After stud insertion, the end panel restraint bar 35a is moved to a desired end position in the aircraft. As illustrated in FIG. 1, when the end panel restraint bar is in the desired position, it is located orthogonal to the longitudinal axis of the aircraft, near one end thereof, such as the tail. When the desired position is reached, the panel restraint bar locks 95 of the end panel restraint bar, in the manner previously described, lock the end panel restraint bar in position. Thereafter, two outboard treadway panels are positioned such that the apertures 77 located along one of their transverse edges are aligned with the outboard outwardly extending pins 73 of the end panel restraint bar 35a. The thusly positioned outboard treadway panels are then pressed toward the end panel restraint bar 35a, into tight alignment therewith. Next, two inboard treadway panels 33 are positioned such that the apertures 77 located along one of their transverse edges are aligned with the inboard outwardly extending pins 73 of the end panel restraint bar 35a. The inboard treadway panels are spaced from one another, and from their adjacent outboard treadway panels. After alignment, the inboard treadway panels are pressed toward the end panel restraint bar until a snug fit is achieved. (Obviously, if desired, the inboard treadway panels can be installed prior to the outboard treadway panels.)

After a row of treadway panels are installed in the manner just described, a panel restraint bar 35 is positioned forwardly of the installed panels. The panel restraint bar is first positioned such that it stud heads pass through apertures in the seat tracks. Thereafter, the panel restraint bar is slid toward the installed inboard and outboard treadway panels 31 and 33, until the outwardly projecting pins 73 of the panel restraint bar being installed pass into the apertures located in the adjacent transverse edge of the installed treadway panels. When a snug fit is achieved, the panel restraint bar locks of the panel restraint bar being installed lock the panel restraint bar in position. Thereafter, a second row of inboard and outboard treadway panels 31 and 33 are installed on the opposite side of the installed panel restraint bar, followed by the installation of another panel restraint bar. This procedure continues until substantially the entire deck 22 of the aircraft is covered with treadway panels.

As will be understood from the instant description, and viewing FIGS. 1 and 2, outboard treadway panels located toward the loading end, e.g., nose, of the aircraft are somewhat different in shape than are the outboard treadway panels located in the mid and rear sections of the aircraft. However, even though different in shape, the method of installation of these treadway panels and their associated panel restraint bars remains the same.

INBOARD GUIDE RAIL, VERTICAL RESTRAINT AND ROLLER ASSEMBLIES

Inboard and outboard guide rail, restraint and roller assemblies are affixed to, and mounted on, the mid and rear inboard and outboard treadway panels, respectively, so as to guide and support standard cargo pallets as they are being loaded. Inboard guide rail, vertical restraint and roller assemblies 32, suitable for use by the invention, are illustrated in FIGS. 9 and 10, in extended and retracted positions, respectively.

As best illustrated in FIG. 1, the inboard guide rail, vertical restraint and roller assemblies 32 are located along the longitudinal, spaced, adjacent edges of the inboard treadway panels 33. The inboard guide rail, vertical restraint and roller assemblies 32 each comprise an elongated hinge bracket 111 attached to the inner edge of the associated inboard treadway panels 33. When viewed in cross section, the hinge brackets 111 include triangular outwardly extending arms 113 located at either end of the associated panel and, if desired, intermediate the ends of the panel. Formed in the upper, outer corners of the arms 113 are pivot holes 115. Generally L-shaped guide rails 117 have the outer ends of their long arms rotatably attached to the hinge brackets 111 at the pivot holes 115 by suitable pins. The short arms 119 or lips of the guide rails 117 are positioned such that they lie parallel to, and above, the associated treadway panel when the guide rails are in their extended position, illustrated in FIG. 9.

Two adjacent guide rails 117 are latched in their extended position by inboard latch mechanisms 125. An inboard latch mechanism is located on either end of a pair of laterally adjacent guide rails 117. Each latch mechanism includes a pair of aligned arms 127 affixed to, and extending outwardly from, the panel restraint bars located at the ends of the inboard treadway panels, between the hinge brackets 111. Spaced between, and rotatably affixed to (by a horizontal bolt 131), the aligned arms 27 is an inboard latch housing 129. The inboard latch housing 129 is, thus, rotatable through a vertical arc. When the guide rails 117 are in their extended positions, the latch housings 129 are positioned between the guide rails and lock them in place via a vertical slug latching mechanism.

More specifically, each latch housing houses a vertical slug 133 mounted in a cylindrical vertical aperture 135. The vertical slug 133 includes an upper cylindrical section 137, substantially equal in size to the size of the vertical aperture 135, and a lower cylindrical section 139 also substantially equal in size to the size of the vertical aperture 135. Located about the periphery of the lower cylindrical section 139 is an O-ring seal 141. Located between the upper and lower cylindrical sections 137 and 139 is a smaller diameter cylindrical section 143. Orthogonally located with respect to the region of the vertical aperture 135 wherein the upper cylindrical section 137 of the slug 133 normally lies are two cylindrical, aligned horizontal apertures 145.

Each horizontal aperture 145 houses a detent slug 147. The detent slugs 147 include outwardly projecting lock rings 149, located intermediate their ends. Located between the lock rings 149, and Z-shaped panels 151 enclosing outer openings into the horizontal apertures 145, are coil springs 153. The Z-shaped panels include apertures through which the outer tips of the dent slugs pass. The positioning of the coil springs is such that they tend to press the dent slugs 147 inwardly toward the vertical aperture 135. Such inward movement is prevented when the vertical slug 133 is positioned such that the upper cylindrical section 137 is aligned with the horizontal apertures 145, and allowed when the smaller diameter cylindrical section 143 is aligned with the horizontal apertures.

The detent slugs 147 have a length such that when the upper cylindrical section 137 of the vertical slug 133 lies in the region of the vertical aperture 135 aligned with the detent slugs 147, the detent slugs 147 are forced outwardly. If, when the detent slugs are in this position, the guide rails 117 are in their extended position and the housing 129 is appropriately positioned between the guide rails, the outer tips of the detent slugs 147 lie in aligned apertures 155 formed in guide rails 117. This is the latched position.

When it is desired to disengage or unlatch the guide rails 117, a ring 157 rotatably pinned to the upper end of the vertical slug 133 is raised upwardly, in the direction of the arrow illustrated in FIG. 9. This action brings the smaller diameter cylindrical section 143 into alignment with the horizontal apertures 145, allowing the coil spring force to move the detent slugs toward one another. Thus, the outer tips of the slugs 147 are withdrawn from the aligned apertures 155 formed in the guide rails 117. The latch housing 129 is now free to rotate, about the shaft of the bolt 131, from the latched position illustrated in FIG. 9 to the stowed position illustrated in FIG. 10. When the latch housing is in its stowed position, the guide rails 117 are free to rotate from their extended position whereat their short arms 119 lie above the associated panel, through an arc of approximately 180 degrees, to a retracted position whereat the short arms 119 lie slightly above the deck 23 of the aircraft. Affixed to the pin 116 about which the guide rails 117 rotate are roller brackets 161. The roller brackets are generally U-shaped in cross section and include arms 163 for rotatably attaching them to the pin 116. The roller brackets 161 support rollers 165 mounted on shafts 167. The roller brackets are positioned such that the shafts 167 are orthogonally located with respect to the longitudinal axis of the guide rails 117. The rollers 165 are positioned such that they support the pallets 123 so that flanges 121, extending outwardly along the lower longitudinal edges of pallets, lie immediately beneath the short arms 119 of the guide rails 117. Thus, the short arms provide restraints against vertical movement of pallets positioned in this manner. The roller brackets 161 and rollers 165 are stowed by rotating them about the pins 116, after the guide rails have been stowed, from a position whereat the base of the roller brackets lie on their associated panel to a position whereat the roller brackets lie between adjacent inboard treadway panels 33. The roller brackets of adjacent guide rails 117 are alternately located along the lengths of the guide rails such that impingement between the roller brackets and rollers does not occur as they are moved between their extended and stowed positions.

OUTBOARD GUIDE RAIL, LONGITUDINAL-VERTICAL RESTRAINT AND ROLLER ASSEMBLIES

Figure 11:
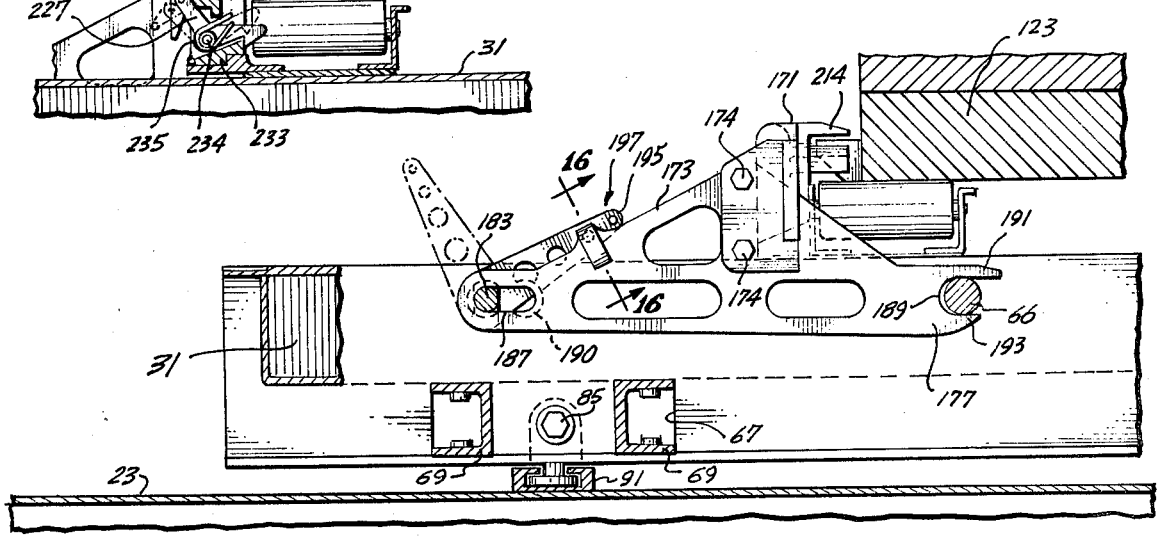
FIG. 11 is a cross-sectional view of an end of an outboard guide rail, longitudinal-vertical restraint and roller assembly illustrating the attachment of such an assembly to a panel restraint bar.
Figure 12:
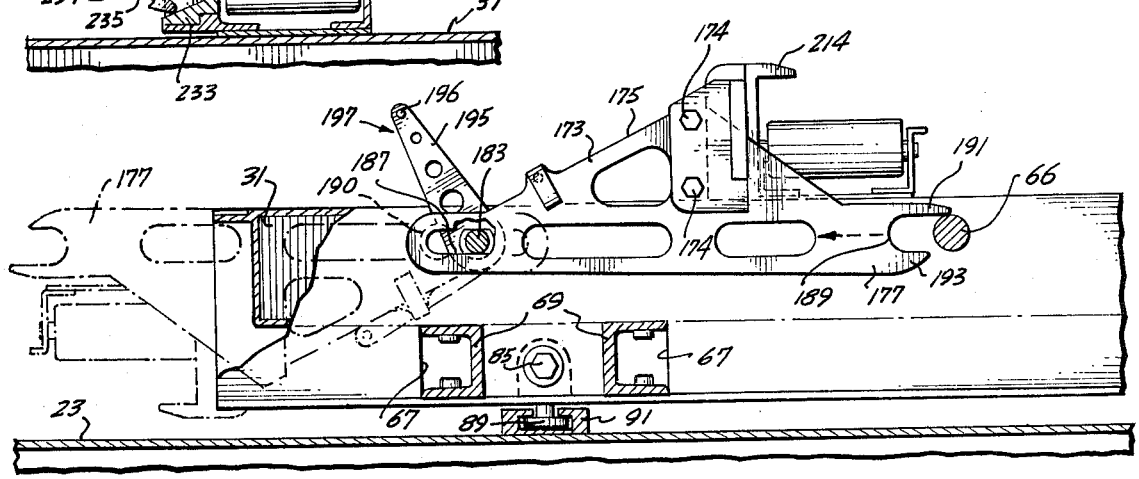
FIG. 12 is similar to FIG. 11, showing the outboard guide rail, longitudinal-vertical restraint and roller assembly in a detached position ready for movement to a retracted position (shown in phantom)

The outboard guide rail, longitudinal-vertical restraint and roller assemblies are best illustrated in FIGS. 3 and 13–16. As illustrated in FIG. 3, each outboard guide rail, longitudinal-vertical restraint and roller assembly comprises an elongated outboard guide rail 171 orthogonally mounted between a pair of end plates 173 and attached thereto by bolts 174. As illustrated in FIGS. 11 and 12, the end plates are generally triangular in shape and include an upwardly projecting hill 175 and inboard and outboard extensions 177 and 179. The end plates are mounted between the C-channels 61 and 63 of the panel restraint bars so as to rotate about outboard pivot pins 183. As with the tie downs 66, the outboard pivot pins 183 extend horizontally between the webs of the C-channels 61 and 63. More specifically, the outboard extension 179 of each end plate includes an elongated slot 187 through which the associated outboard pivot pin 183 passes. The inboard extension 177 includes a horizontally oriented, U-shaped aperture 189 having upper and lower outwardly extending legs 191 and 193 between which a tie down bracket 66 passes, when the outboard guide rail, longitudinal-vertical restraint and roller assemblies are in a locked, extended position. The upper leg 191 is slightly longer than the lower leg 193.

Located between two adjacent end plates i.e. two end plates lying in the space between a pair of C-channels of a panel restraint bar is a lock handle 195, best illustrated in FIG. 15. The lock handle 195 is also rotatably mounted on the associated outboard pivot pin 183 and includes an outwardly extending boss 186 located on either side. Each boss includes a pair of parallel flats 188. The bosses lie in undercut FIG.-8 type apertures 190 formed in the adjacent region of the end plates 173 about the elongated slots 187. More specifically, a circular undercut region surrounds each end of the elongated slots 187. The circular under cut regions plus the portion of the slot connecting these regions forms the FIG.-8 type aperture 190.

In operation, when the lock handle 195 is rotated to an unlocked position, whereat the parallel flats 188 lie parallel to the longitudinal axis of the elongated slot, the end plates are free to be moved laterally back and forth. When they are moved to their most outboard position (FIG. 12), the lower leg 193 of the U-shaped aperture 189 is outboard of the tie down bracket 66, even though the longer upper leg 191 still rests thereon. When in this position, the end plates are free to rotate in an outboard direction, to the phantom position illustrated in FIG. 12 whereat they lie in a space between the outer edge of the treadway panels and the wall of the fuselage of the aircraft. The arc of rotation is approximately 180°. Preferably, the lock handle is caught by and rotates with the end plates to a position whereat it entirely lies beneath the upper surface of the C-channels and the flats 188 of the bosses 186 are out of alignment with the elongated slot 187. This is the retracted or stowed position of the outboard guide rail, longitudinal-vertical restraint and roller assembly. Reversal of this procedure brings the outboard guide rail, longitudinal-vertical restraint and roller assembly to its extended position. That is, the end plates are rotated through 180° until the upper leg of the U-shaped aperture rests on the tie down bracket 66; the flats 188 are aligned with the elongated slot; the end plates are moved inboard; and, the lock handle is moved to a position whereat the flats are no longer aligned with the elongated slot.

The lock handle 195, when the outboard guide rail, longitudinal-vertical restraint and roller assembly is in its extended position, is located adjacent the upper outboard edge of the hill 175 of the end plates. The lock handle 195 is prevented from "falling" between the end plates by a pin 196 that passes transversely through its outer end. The lock handle is locked in this position by a latch mechanism 197 best illustrated in FIG. 16. The lock handle latch mechanism 197 comprises a stud 199 having a head at one end. Surrounding the shaft of the stud and lying in a suitably positioned aperture 200 in the adjacent end plate is a coil spring 205. The non-headed end of the stud extends outwardly from the aperture 200 and is pinned to a latch handle 203. The pin lies orthogonal to the longitudinal axis of the stud 199. The latch handle 203 includes a cam surface formed such that, when it is suitably rotated about the pin, the stud is withdrawn and compresses the coil spring 205. The lock handle includes an aperture 201 into which the extended slug moves when the lock handle is in an aligned position, and the latch handle 203 is positioned so as to allow the coil spring to press the stud head outwardly.

As illustrated in FIGS. 11–14, outboard roller brackets are affixed to the outboard guide rails 171. The outboard roller brackets 207 include a base plate 207 affixed to the lower edge of the extended guide rails 171. Mounted along the edge of the base plate remote from the associated guide rail 171 are a plurality of spaced Z-brackets 209. Located between the Z-brackets 209 and the guide rail 171 are rollers 211 mounted on horizontal shafts 213. The rollers are thus positioned beneath the inwardly extending lip 214 of the outboard guide rails 171. The lips 214 function the same as the short arms 119 of the inboard guide rails 117, described above, i.e., they restrain vertical pallet movement.

Figure 13:
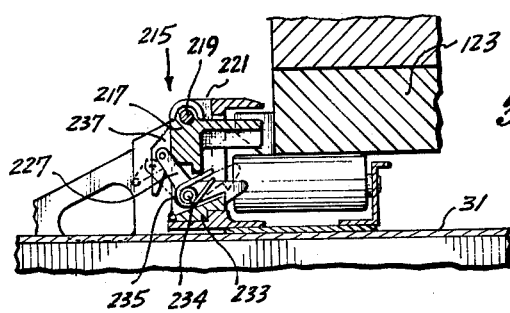
FIG. 13 is a cross-sectional view of a pallet latch in its latched position.
Figure 16:
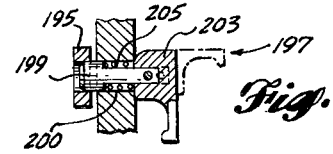
FIG. 16 is a cross-sectional view along line 16—16 of FIG. 11.
Figure 14:
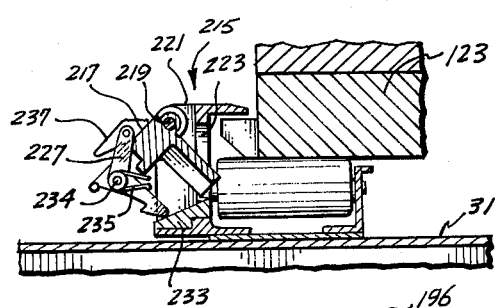
FIG. 14 is a cross-sectional view of a pallet latch in its delatched position.

In addition to the roller brackets and rollers, FIGS. 13 and 14 also illustrate a side locking stop assembly 215 adapted to lock cargo pallets in position after they have been moved to a desired position. Specifically, the side locking stop assemblies prevent cargo pallets from moving longitudinally with respect to the longitudinal axis of the fuselage of the aircraft. Obviously, lateral motion is prevented by the inboard and outboard guide rails; and, as noted vertical restraint is provided by the lips.

The side locking assemblies 215 are spaced along the length of the guide rails 171. Each side locking assembly includes a pellet latch 217 that is generally angle-shaped when viewed in a plane orthogonal to the guide rails. At the juncture of the two arms (located at an upper, outer corner) of the pallet latch 217 is an aperture through which a pin 219 passes. The pin 219 is affixed to a vertical flange 221 projecting outwardly from the adjacent region of the outboard guide rail 171. The pallet latches 217 are rotatable through apertures 223 formed in the outboard guide rail 171 in line with the pallet latches. The pallet latches are latched into position by a latching mechanism that includes: an obtuse angle L-shaped arm 227; a coil spring 235; a latch lever 237; and, a ramp 233. The L-shaped arm 227 is pivotally attached by a pin 234 at its juncture to an undercut region formed in the lower arm of the pallet latch, beneath the pivot point of the pallet latch. One arm of each L-shaped arm includes a downward projection or hook shaped end 231 adapted to impinge on the ramps 233, which project inwardly and upwardly from the guide rail 171 into the apertures 223. The coil spring 235 is located about the pivot point of the L-shaped arm 227, and is adapted to press the downward projection 231 toward the ramp 233. The other arm of the L-shaped arm 227 is horizontally, pivotally attached to the mid region of the latch lever 237. The latch lever impinges on the outer surface of the pallet latch 217. When the lower end of the latch lever is pulled outwardly, the interconnection to the L-shaped arm 227 rotates the L-shaped arm 227 against the force of the coil spring 235 causing the downward projection 231 to delatch from the ramp 233. After delatching, the pallet latches 217 are free to be rotated outwardly through the apertures 223 from the position illustrated in FIG. 13 to the position illustrated in FIG. 14. Thus, the pallet latches 217 are moved to a position whereat they no longer lock an adjacent cargo pallet against longitudinal movement.

In summary, each outboard guide rail, longitudinal-vertical restraint and roller assembly is a retractable mechanism that includes outboard guide rails adapted to be moved to an extended position whereat they are adapted to guide cargo pallets during movement parallel to the longitudinal axis of the aircraft. The cargo pallets are partially supported during such movement by rollers affixed to the guide rails. The outboard guide rails are also movable to a retracted position whereat the guide rails are withdrawn to allow rolling stock to be loaded directly on the treadway panels. In the retracted position the now inverted rollers and guide rails lie beyond the outer edge of the associated outboard treadway panels in a space between the wall of the fuselage and the edge of the treadway panel, as illustrated in phantom in FIG. 12. In addition, the outboard guide rail and roller assemblies include side locking stops adapted to engage spaced apertures located along the lateral lower corners of cargo pallets so as to lock the pallets against longitudinal movement; and, lips to prevent vertical movement.

FLIP-UP ROLLER ASSEMBLIES

As will be understood from the foregoing description, cargo pallet support rollers form part of the inboard and outboard guide rail, restraint and roller assemblies. These rollers are located along the lateral edges of the cargo pallets, in the region of the guide rails. Due to the weight of the cargo to be transported on cargo pallets in some instances, this end support may prove to be inadequate. Thus, it is desirable to provide additional support intermediate the edges of the cargo pallets. This support is provided by flip-up roller assemblies 251 located along the spaced, adjacent edges of the inboard and outboard treadway panels. The positions of the flip-up roller assemblies 251 are best illustrated in FIG. 3. A preferred embodiment of a flip-up roller assembly formed in accordance with this invention is illustrated in FIG. 17.

The flip-up roller assemblies each comprise a hinge bracket 253 affixed to the edges of the inboard and outboard treadway panels. The hinge brackets include outwardly extending triangular arms 254 located whereat flip-up support rollers 255 are to be located. The upper, outer corner of the arms 254 include apertures 256 to which are attached flip-up roller support brackets 257. The flip-up roller support brackets 257 are generally U-shaped brackets between which support rollers 259 are mounted for rotation on horizontal shafts 261. The flip-up roller support brackets include arms 260 extending outwardly from their base, at one corner. The arms 260 include apertures via which the roller brackets are pinned for rotation to the apertures 256 in the arms 254 of the hinge brackets 253. The support rollers are moved between a deployed position (illustrated in the right side of FIG. 17) whereat the lower surface of the brackets rest on the upper surface of the associated treadway panel and a retracted position whereat the rollers lie in the space between the inboard and outboard treadway panels.

FORWARD GUIDE RAIL, RESTRAINT AND ROLLER ASSEMBLIES

As will be appreciated by those skilled in the aircraft art and others, the forward walls of the fuselage of an aircraft diverge inwardly until they merge into a nose. In this region, the space for storage of cargo pallets is substantially less than in the mid region of the aircraft. In order to economically utilize the forward region, the invention provides for the transportation of a single column of cargo pallets in the forward end of the aircraft, rather than a dual column, as transported in the mid region. It will also be appreciated that the inboard and outboard guide rail, restraint and roller assemblies previously described cannot be utilized in the front end of the aircraft. Rather, forward guide rail, restraint and roller assemblies, located at the juncture between the inboard and outboard treadway panels, are used. FIG. 18 is a cross-sectional view of a forward guide rail, restraint and roller assembly 301 formed in accordance with the invention.

The forward guide rail and roller assembly 301 illustrated in FIG. 18 includes a Z-shaped bracket 303 affixed to the lower adjacent corner of the outboard treadway panel 31 such that one leg lies below the panel and the other leg extends outwardly in a plane lying beneath the top of the panel. A reinforced (by ribs) hinge arm 305 is rotatably affixed along one edge to a projection 306, extending outwardly from the Z-shaped bracket 303, by a pin 307. The outer edge of the long arm of a L-shaped guide rail 308 is pinned for rotation to the opposed edge of the hinge bracket 305. Thus, the guide rail 308, the hinge arm 305 and the Z-shaped bracket 303 form a double acting hinge assembly. The assembly is movable between a stowed position (illustrated in phantom in FIG. 18) whereat the guide rail 308 and hinge arm 305 lie in generally parallel planes and their junction point impinges on the deck, and an extended position (illustrated in solid line in FIG. 18) whereat the long arm of the guide rail is generally vertically oriented and the short arm extends over the inner treadway panel 33. In the extended position, the guide rail 308 is latched to a forward roller assembly 309 in the manner hereinafter described.

The forward roller assembly 309 includes an elongated angle bracket 310 located just beneath the upper outer corner of the inboard treadway panel 33. Mounted on the angle bracket 310 is an elongated Z-shaped hinge bracket 311. The Z-shaped hinge bracket 311 includes one leg that lies on the outwardly projecting leg of the angle bracket 310 and another leg extending into and coplanar with the top of the inboard treadway panel 33. Projecting upwardly and outwardly from the Z-shaped hinge bracket 311 are spaced hinge protrusions 312. Pinned to the hinge protrusions 312 by horizontal pins are the lower corners of U-shaped roller brackets 313. Rotatably mounted on shafts 314 in the apertures in the roller brackets 313 are rollers 315.

Flanges 316, coplanar to the base of the U-shaped roller bracket 313, extend outwardly from the base, on the edge remote from the hinge edge of the roller brackets. Mounted on the flanges 316 are latch pins 317. The latch pins 317 comprise studs 318 and orthogonal pins 319 passing through one end. The other end of the latch pins, which is nearest the roller bracket 313, is ring shaped. The latch pins 317 are, in a conventional manner adapted to pass through circular/slot apertures suitably position in the inboard treadway panels, when aligned therewith. After such passage, rotation of the latch pins locks the roller brackets in place.

As noted above, the guide rails 308 are latched to the forward roller assemblies 309. Latching is accomplished via a latch mechanism 320 comprising a handle 321 having a stud 322 extending orthogonally outwardly from one end. The stud terminates in a locking lug 323. The locking lug, when oriented correctly, is adapted to pass through a suitably formed aperture 324 located in the outer leg of the roller bracket 313. Rotation of the handle to a vertical lock position after such insertion prevents the lug from being withdrawn through the aperture 324. The handle is held in the lock position by a spring loaded detent 325 located vertically beneath the stud 322.

Unitarily formed with the forward guide rails 308 located along one edge of the inboard treadway panels 33 are side locking restraint lugs 308a. The side locking restraint lugs are located in the corner where the lip of the forward guide rails join the main rail structure. The side locking restraint lugs are adapted to project into the spaced apertures located along the lateral lower corners of cargo pallets and, thus, function in a manner similar to the side locking stop assemblies 215 described above with respect to the outboard guide rail, longitudinal-vertical restraint and roller assemblies to prevent, when engaged, longitudinal movement of cargo pallets located between the forward guide rails.

In operation, the forward guide rail and roller assembly is moved from its extended position to its stowed position by first delatching the guide rail 308. Thereafter, the guide rail and hinge arm 305 are collapsed in the manner previously described. Next, the latch pins 317 of the roller assemblies 309 are loosened and the roller assemblies are rotated to their stowed position, whereat the base of the roller bracket 313 extends across the space between the inboard and outboard treadway panels.

When positioning cargo pallets between the forward guide rail, restraint and roller assemblies, the assembly without the side locking restraint lugs 308a is first latched into its operative position. Then cargo pallets are moved to their transportation position. Finally, the forward guide rail, restraint and roller assembly with the side locking restraint lugs is latched in its operative position (the related forward roller assembly 309 having been positioned and latched before the pallets were moved to their transportation position).

INVERTIBLE CASTER AND ROLLER ASSEMBLIES

It will be appreciated by those skilled in the cargo transportation and other arts that it is desirable to have the ability to multidirectionally move cargo pallets in order to align the pallets with the guide rails prior to longitudinally moving the cargo pallets to a final transportation position. Obviously, roller assemblies designed for bidirectional movement are inadequate to provide the desired multidirectional movement ability. Thus, the invention provides other mechanism for accomplishing this result. Specifically, the invention provides invertible caster assemblies 351 positioned in the treadway panels located in the forward, or cargo receiving, region of the aircraft. They may, for example, be located in the end four rows. The caster assemblies 351 are best illustrated in FIGS. 19 and 20 and comprise an omnidirectional caster housing 353 including a plurality of cups 355. The cups in turn partially house caster balls or spheres 356. Four cups and balls are illustrated in FIGS. 19 and 20. The balls extend beyond the caster housing 353 in a common plane. Thus, a planar object (e.g. cargo pallet bottom) placed on the balls can be moved in a multidirectional manner in the support plane.

Extending outwardly from the surface of the caster housing 353, remote from the ball support plane, is an attachment flange 357. The attachment flange is square and includes apertures through which cap screws 358 pass. The cap screws 358 allow the caster housing to be mounted in either an extended position whereat the ball support plane is spaced above the related treadway panel or a housed (inverted) position whereat the caster housing lies in an aperture 359 located in the treadway panel at the predetermined location of the caster assembly 351.

In some cases it may be desirable to use invertible, bidirectional roller assemblies in place of some of the caster assemblies. A suitable roller assembly 361 is illustrated in cross section in FIG. 21. The bidirectional roller assembly illustrated in FIG. 21 comprises a U-shaped roller bracket 362 mounted on a base plate 363. The base plate corresponds to the size of the flange 357 of the caster housing 353 and also includes apertures in its corners that allow the base plate to be affixed to the treadway panels either in an upright or in an inverted position. Mounted between the legs of the roller bracket 352 on a shaft 364 is a roller 365.

HOLDDOWN RING ASSEMBLIES

As briefly noted above, the inboard and outboard treadway panels 31 and 33 include a plurality of apertures 51 (illustrated as four apertures) extending vertically through each panel. The apertures are aligned with the seat track 91 located in the deck 23 of the aircraft fuselage 25. Each aperture houses a holddown ring assembly 53. A holddown ring assembly formed in accordance with the invention is illustrated in FIG. 22 and comprises first and second sittings 373 and 375. Each fitting 373 or 375 includes a housing 377 having two steel studs 379 affixed to its lower surface. The steel studs 379 include heads adapted to fit into the apertures 93 in the seat tracks 91. Located at one end of each housing 377 is a locking mechanism 381 similar to the locking mechanism 95 of the panel restraint bars.

In operation, the studs 379 pass through apertures 93 in the track 91. Thereafter, the housings are slid to a position such that each stud 379 is positioned between two apertures 93. Then, the locking mechanisms 381 are activated to lock the housings in place. Thus, the housings are affixed to the seat track of the aircraft.

Passing through each housing is a secondary ring 383. Running through both secondary rings 373 is a load attachment ring 385. Preferably, each fitting 373 and 375 has a rated vertical load of 8,000 lbs. and a rated side load of 6,000 lbs; and, the rings have a rated loading of at least 5,000 lbs.

CONCLUSION

It will be appreciated from the foregoing description that the invention generally comprises a column/row array of treadway panels. The panels are separated by panel restraint bars orthogonally positioned with respect to the longitudinal axis of the aircraft. The panel restraining bars not only maintain the treadway panels in the desired orientation, they also affix them to the deck of an aircraft. The panels include associated guide rail and roller assemblies that allow the panel array to be used to either support rolling stock during transporation or cargo pallets adapted to support nonrolling cargo. The structure is such that a mixture of rolling and nonrolling cargo can be transported, if desired. In either case, both the rolling and/or pallet supported cargo can be readily tied down utilizing a holddown ring mechanism affixed to the aircraft, in combination with straps or other attachment mechanism. Moreover, the guide rail, restraint and roller mechanisms allow cargo pallets to be rapidly moved from the entryway of the aircraft to a desired transport position, as well as removed from the aircraft. The guide rail, restraint and roller assemblies are designed and positioned such that they coact with standard cargo pallets and guide the cargo pallets to the desired position. Moreover, in addition to the holddown ring assemblies for maintaining the cargo pallets in position, side locking stops are provided to prevent the lateral movement of the pallets. Further, the guide rail, restraint and roller assemblies are retractable so as to allow any desired portion of the aircraft to be utilized for transporting rolling stock. Also, invertible caster and roller assemblies, located in the entryway of the aircraft, are provided to allow cargo pallets to be readily aligned with the guide rails prior to movement to their final position.

It will also be appreciated from the foregoing description that the invention allows an aircraft initially designed for passenger transportation to be readily converted into a cargo transport. All that needs to be done to accomplish the transformation is to remove passenger amenities, e.g., seats, hostess service stations, etc., and install a plurality of treadway panels and panel restraint bars. Alternatively, the invention allows an aircraft to be rapidly converted from a cargo transport to passenger transport.

While the preferred embodiment of the invention has been illustrated and described, it will be appreciated that various changes can be made therein without departing from the spirit and scope of the invention. For example, the attachment of treadway panels to panel restraint bars can be accomplished other than by a pin-/aperture arrangement. Moreover, while a specific mechanism for attaching the treadway panels to a specific type of seat track has been illustrated and described, various other attachment mechanisms adapted to attach treadway panels to other forms of seat tracks or seat holddown devices can be utilized, if desired. Hence, the invention can be practiced otherwise than as specifically described herein.

The embodiments of the invention in which exclusive property or privileges is claimed are defined as follows:

1. An integrated treadway cargo handling system for converting, after the removal of predetermined passenger amenities, an aircraft from passenger use to cargo use, said integrated treadway cargo handling system comprising:
    a plurality of treadway panels suitable for being arranged in a predetermined array on the deck of an aircraft, certain of said panels being disposed such that their adjacent edges are parallel, but spaced-apart, said spacing being such that a recess is formed that extends along and between said adjacent edges;

attachment means for attaching said plurality of treadway panels to said deck of an aircraft in said predetermined array;

a plurality of guide rail means, each of which is rotatably mounted on a separate one of said certain panels along said adjacent edge thereof for rotation between a retracted out-of-the-way position and an extended operative position, said guide rail means lying in said recess when in said retracted out-of-the-way position and protruding above upper surfaces of said certain panels when in said extended operative position for guiding cargo pallets to and from transportation positions; and latching means for each of said guide rail means for releasably latching each of said guide rail means in their extended position.

2. The integrated treadway cargo handling system of claim 1 further comprising:

a plurality of pallet supporting roller assemblies, said assemblies rotatably mounted in spaced relationship along said adjacent edges of the one of said certain panels on which said guide rail means are mounted, said assemblies being movable between extended operative positions and retracted out-of-the-way positions, when in their extended operative positions said roller assemblies lying above said upper surfaces of said panels and when in their retracted out-of-the-way positions said roller assemblies lying in said recesses;

said roller assemblies each having a roller mounted for rotation about an axis, said axes of said rollers being orthogonal to said guide rail means, and when said roller assemblies are in their extended operative positions said axes being parallel to the upper surfaces of said panels.

3. The integrated treadway cargo handling system of claim 1 wherein said guide rail means include restraint means for engaging and restraining pallets against movement in a vertical direction with respect to said panels, and said guide rail means further include restraint means for engaging and restraining pallets against movement in a direction along said guide rail means.

4. An integrated treadway cargo handling system for converting, after removal of predetermined passenger amenities, an aircraft from passenger use to cargo use, said integrated treadway cargo handling system comprising:

a plurality of treadway panels suitable for being arranged in a predetermined row/column array on the deck of an aircraft to form a substantially coplanar composite treadway surface in which the columns of said array lie parallel to the longitudinal axis of said aircraft and the rows of said array lie orthogonal to the longitudinal axis of said aircraft, said plurality of treadway panels including a set of inboard panels and a set of outboard panels, each of said rows of said treadway panels including at least two inboard treadway panels arranged with their adjacent edges in spaced apart relation to form a space therebetween extending parallel to the longitudinal axis of said aircraft;

retractable inboard guide rail, restraint and roller assemblies movably mounted on the spaced, adjacent edges of the inboard treadway panels that are located in a first predetermined region of said aircraft, and retractable outboard guide rail, restraint and roller assemblies movably mounted on the outboard panels that are located in said first predetermined region of said aircraft;

said retractable inboard and outboard guide rail, restraint and roller assemblies being movable between extended and retracted positions such that said assemblies protrude above said treadway surface when in their extended positions for supporting the bottoms of cargo pallets and guiding the edges of such pallets as they are moved to and from transportation positions, and such that said assemblies are recessed relative to said treadway surface when in their retracted positions for providing a flat, unobstructed treadway for loading and unloading transported rolling cargo thereover;

said retractable inboard guide rail, restraint and roller assemblies having inboard guide rails rotatably mounted along said spaced, adjacent edges of said certain of said inboard treadway panels so as to be rotatable between said extended positions whereat said inboard guide rails project upwardly along both of said spaced, adjacent edges of said inboard treadway panels and said retracted positions whereat said inboard guide rails lie in said space between said spaced, adjacent edges of said inboard treadway panels, and latching means for latching said inboard guide rails in their extended positions; and hold-down means for preventing the movement of rolling and pallet transported cargo when said rolling and pallet transported cargo are lashed to said hold-down means during transportation.

5. An integrated treadway cargo handling system as claimed in claim 4 wherein said inboard guide rail, restraint and roller assemblies also include a plurality of inboard rollers rotatably mounted in spaced relationship along said spaced, adjacent edges of said inboard treadway panels, said inboard rollers adapted to be rotated between an extended position whereat said rollers lie above the upper surface of said inboard treadway panels and a retracted position whereat said rollers lie in the space between said spaced, adjacent edges of said inboard treadway panels.

6. An integrated treadway cargo handling system as claimed in claim 5 wherein said outboard guide rail, restraint and roller assemblies include:

outboard guide rails movable between an extended position whereat said outboard guide rails project upwardly from related outboard treadway panels parallel to the longitudinal axis of said aircraft and a retracted position whereat said outboard guide rails lie beneath the upper surface of said outboard treadway panels; and, outboard rollers movable between an extended position whereat said rollers lie above the upper surface of said outboard treadway panels and a retracted position whereat said rollers lie beneath the upper surface of said outboard treadway panels.

7. An integrated treadway cargo handling system as claimed in claim 6 wherein said outboard rollers are affixed to said outboard guide rails.

8. An integrated treadway cargo handling system as claimed in claim 7 wherein said outboard guide rail, restraint and roller assemblies include locking means for locking said outboard guide rails and said outboard rollers in their extended positions.

9. An integrated treadway cargo handling system as claimed in claim 8 including pallet locks affixed to said outboard guide rails for locking prepositioned pallets against movement in a direction parallel to the longitudinal axis of said aircraft.

10. An integrated treadway cargo handling system as claimed in claim 9 wherein each of said inboard and outboard guide rails include arms formed such that the arms of a pair of inboard and outboard guide rails, affixed to adjacent inboard and outboard treadway panels project toward one another when said guide rails are in their extended positions.

11. An integrated treadway cargo paneling system as claimed in claim 10 wherein said attachment means comprises elongated panel restraint bars, said panel restraint bars being located orthogonal to the longitudinal axis of said aircraft and including attachment devices for attaching said panel restraint bars to passenger seat tracks located in said deck of said aircraft.

12. An integrated treadway cargo handling system as claimed in claim 11 wherein:
(A) each of said panel restraint bars comprise:
(1) a pair of elongated C-channels;
(2) channel attachment means for mounting said pair of elongated C-channels in back-to-back, spaced relationship; and,
(3) a plurality of pins mounted along the longitudinal length of said C-channels, said plurality of pins mounted so as to project outwardly between the legs of said C-channels; and,
(B) said inboard and outboard treadway panels include edge apertures suitable for receiving a predetermined number of said plurality of pins.

13. An integrated treadway cargo handling system as claimed in claim 12, wherein said channel attachment means comprises a U-channel mounted between said pair of C-channels, said U-channel having legs substantially equal in length to the thickness of said treadway panels, said U-channel being mounted between said C-channels so that the upper edges of the legs of said U-channel are essentially coplanar with the upper surfaces of said C-channels.

14. An integrated treadway cargo handling system as claimed in claim 13 including: apertures formed in said C-channels beneath said U-channel; and, support C-channels mounted in said apertures in said C-channels so as to lie orthogonal to said C-channels.

15. An integrated treadway cargo handling system as claimed in claim 14 wherein said retractable guide and support means also includes forward guide rail, restraint and roller assemblies located along adjacent edges of the inboard and outboard treadway panels located in a second predetermined region of said aircraft, said second predetermined region being different than said first predetermined region.

16. An integrated treadway cargo handling system as claimed in claim 15 wherein said forward guide rail, restraint and roller assemblies include:
a forward guide rail and a hinge arm, said hinge arm being hinged at one end to the lower edge of an outboard treadway panel that is adjacent an inboard treadway panel, and at the other end to a forward guide rail, whereby a double hinge arrangement is formed, said double hinge arrangement allowing said forward guide rail to be moved between an extended position whereat said forward guide rail lies along the edge of an inboard treadway panel and a retracted position whereat said forward guide rail lies in the space between inboard and outboard treadway panels; and,
forward rollers hinged to the edge of an inboard treadway panel adjacent an outboard treadway panel so as to be rotatable between an extended position whereat said rollers lie above said inboard treadway panel and a retracted position whereat said rollers lie between inboard and outboard treadway panels; and,
latching means for latching said forward guide rails to said forward rollers when said forward guide rails and said forward rollers are in their extended positions.

17. An integrated treadway cargo handling system as claimed in claim 16 including invertible caster assemblies mounted in the treadway panels located in said second predetermined region of said aircraft.

18. An integrated treadway cargo handling system as claimed in claim 17 including flip-up roller assemblies located along the adjacent edges of the inboard and outboard treadway panels located in said first predetermined region of said aircraft.

19. An integrated treadway cargo handling system as claimed in claim 18 wherein:
each of said treadway panels include a plurality of apertures; and,
said hold down means comprises a plurality of hold down ring assemblies, one of said assemblies being affixed to the deck of said aircraft in each of said apertures in said treadway panels.

20. An integrated treadway cargo handling system for converting, after the removal of predetermined passenger amenities, an aircraft from passenger use to cargo use, said integrated treadway cargo handling system comprising:
a plurality of treadway panels suitable for being arranged in a predetermined array on the deck of an aircraft to form a substantially coplanar composite treadway surface in which at least certain of said panels have their adjacent edges spaced apart;
attachment means for attaching said plurality of treadway panels to said deck of an aircraft in said predetermined array;
retractable inboard guide rail, restraint and roller assemblies movably mounted along said spaced, adjacent edges of said certain of said treadway panels in a first predetermined region of said aircraft, and retractable outboard guide rail, restraint and roller assemblies movably mounted on others of said treadway panels located in said first predetermined region of said aircraft, said retractable inboard and outboard guide rail, restraint and roller assemblies being movable between extended and retracted positons in which such assemblies when in their extended positions protrude above said treadway surface for supporting the bottoms of cargo pallets and guiding the edges of such pallets as they are moved to and from transporation positions, and such that said assemblies when in said retracted positions are recessed relative to said treadway surface for providing a flat, unobstructed treadway for loading and unloading transported cargo thereover;
said retractable inboard guide rail, restraint and roller assemblies having inboard guide rails rotatably mounted along said spaced, adjacent edges of said certain of said treadway panels so as to be rotatable between said extended positions whereat said inboard guide rails project upwardly along both of said spaced-adjacent edges of said certain of said treadway panels and said retracted positions whereat said inboard guide rails lie in the space between said spaced-adjacent edges of said treadway panels, and having latching means for latching said inboard guide rails in their extended positions, and further having a plurality of inboard rollers rotatably mounted in a spaced relationship along said spaced-adjacent edges of said certain of said treadway panels, said inboard rollers adapted to be rotated between said extended positions whereat said rollers lie above said treadway surface of said treadway panels and said retracted positions whereat said rollers lie in the space between said spaced-adjacent edges of said treadway panels; and retractable forward guide rail, restraint and roller assemblies mounted along spaced-adjacent edges of others of said treadway panels which are located in a second predetermined region of said aircraft, said second predetermined region being different than said first predetermined region; and hold-down means for preventing the movement of rolling and pallet transported cargo when said rolling and pallet transported cargo are lashed to said hold-down means during transportation 21. An integrated treadway cargo handling system as claimed in claim 20 wherein said outboard guide rail, restraint and roller assemblies include:

outboard guide rails movable between an extended position whereat said outboard guide rails project upwardly from related treadway panels parallel to the longitudinal axis of said aircraft and a retracted position whereat said outboard guide rails lie beneath the upper surface of said treadway panels; and, outboard rollers movable between an extended position whereat said rollers lie above the upper surface of said treadway panels and a retracted position whereat said rollers lie beneath the upper surface of said treadway panels.

22. An integrated treadway cargo handling system as claimed in claim 21 wherein:

said outboard rollers are affixed to said outboard guide rails; and, said outboard guide rail, restraint and roller assemblies include locking means for locking said outboard guide rails and said outboard rollers in their extended positions.

23. An integrated treadway cargo handling system as claimed in claim 22 including pallet locks affixed to said outboard guide rails for locking prepositioned pallets against movement in a direction parallel to the longitudinal axis of said aircraft.

24. An integrated treadway cargo handling system as claimed in claim 22 wherein said forward guide rail, restraint and roller assemblies include:

a forward guide rail and a hinge arm, said hinge arm being hinged at one end to the lower edge of a first treadway panel that is adjacent to a second treadway panel and at the other end to a forward guide rail, whereby a double hinge arrangement is formed, said double hinge arrangement allowing said forward guide rail to be moved between an extended position whereat said forward guide rail lies along the edge of said second treadway panel and a retracted position whereat said forward guide rail lies between said first and second treadway panels; and, forward rollers hinged to the edge of said second treadway panel adjacent an edge of said first treadway panel so as to be rotatable between an extended position whereat said rollers lie above said treadway panel and a retracted position whereat said rollers lie between said first and second treadway panels; and, latching means for latching said forward guide rails to said forward rollers when said forward guide rails and said forward rollers are in their extended positions.

25. An integrated treadway cargo handling system as claimed in claim 24 including invertible caster assemblies mounted in the treadway panels located in said second predetermined region of said aircraft.

26. An integrated treadway cargo handling system as claimed in claim 24 including flip-up roller assemblies located along predetermined adjacent edges of the treadway panels located in said first predetermined region of said aircraft.

27. An integrated treadway cargo handling system for converting, after the removal of predetermined passenger amenities, an aircraft from passenger use to cargo use, said integrated treadway cargo handling system comprising:

a plurality of treadway panels suitable for being arranged in a predetermined array on the deck of an aircraft to form a substantially coplanar composite treadway surface;

attachement means for attaching said plurality of said treadway panels to said deck of an aircraft in said predetermined array, said attachement means having a plurality of elongate panel restraint bars, said panel restraint bars being disposed orthogonally to the longitudinal axis of said aircraft and including attachment devices for attaching said panel restraint bars to passenger seat tracks located in said deck of said aircraft;

each of said panel restraint bars comprising:
(a) a pair of elongated C-channels,
(b) channel attachment means for mounting said pair of elongated C-channels in back-to-back spaced relationship, and
(c) a plurality of pins mounted along the longitudinal length of said C-channels, said plurality of pins mounted so as to project outwardly between the legs of said C-channels;

said treadway panels including edge apertures sized and arranged for receiving a predetermined number of said plurality of pins;

retractable guide and support means mounted on at least certain of said panels and being movable between extended and retracted positions, said retractable guide and support means when in their extended positions protruding above said treadway surface for supporting the bottoms of cargo pallets and guiding the edges of such palletsas they are moved to and from transportation positions, and said retractable guide and support means when in their retracted positions being recessed relative to said treadway surface for providing a flat, unobstructed treadway for loading and unloaidng transported rolling cargo thereover; and hold-down means for preventing the movement of rolling and pallet transporated cargo when said rolling and pallet transporated cargo are lashed to said hold-down means during transportation.

28. An integrated treadway cargo handling system as claimed in claim 27, wherein said channel attachment means comprises a U-channel mounted between said pair of C-channels, said U-channel having legs substantially equal in length to the thickness of said treadway panels, said U-channel being mounted between said C-channels so that the upper edges of the legs of said U-channel are essentially coplanar with the upper surfaces of said C-channels.

29. An integrated treadway cargo handling system as claimed in claim 28 including: apertures formed in said C-channels beneath said U-channel; and, support C-channels mounted in said apertures in said C-channels so as to lie orthogonal to said C-channels.

* * * * *